(12) United States Patent
Chang et al.

(10) Patent No.: US 6,428,754 B1
(45) Date of Patent: Aug. 6, 2002

(54) METHOD AND APPARATUS FOR TREATING EXHAUST GASES

(76) Inventors: Hsueh-Chia Chang; David T. Leighton, both of Department of Chemical Engineering, University of Notre Dame, Notre Dame, IN (US) 46556

(\*) Notice: Subject to any disclaimer, the term of this patent is extended or adjusted under 35 U.S.C. 154(b) by 0 days.

(21) Appl. No.: 08/382,296

(22) Filed: Feb. 1, 1995

(51) Int. Cl.[7] .............................................. B01D 53/86
(52) U.S. Cl. ................................... 422/168; 423/213.2
(58) Field of Search ........................... 423/212, 213.2, 423/213.5, 213.7; 422/168

(56) References Cited

U.S. PATENT DOCUMENTS

| | | | | |
|---|---|---|---|---|
| 3,297,400 A | * | 1/1967 | Eastwood | 423/213.2 |
| 3,375,059 A | * | 3/1968 | Gerhold | 423/212 |
| 3,440,817 A | * | 4/1969 | Sauffer | 423/212 |
| 5,010,051 A | * | 4/1991 | Rudy | 423/213.5 |
| 5,051,244 A | * | 9/1991 | Dunne et al. | 423/212 |
| 5,296,198 A | * | 3/1994 | Abe et al. | 422/180 |

FOREIGN PATENT DOCUMENTS

DE 4117364 * 12/1992 ................ 423/210

\* cited by examiner

Primary Examiner—Steven P. Griffin
(74) Attorney, Agent, or Firm—Baker & Daniels

(57) ABSTRACT

An exhaust gas treatment system and method for treating the exhaust gas of an internal combustion engine includes a catalytic converter and a catalytic preheater or igniter upstream of the catalytic converter. A bypass passage extends around the igniter such that during the ignition period about two-thirds of the exhaust gas is bypassed around the igniter and one-third passes through the igniter. The igniter raises the temperature of the exhaust gases passing therethrough to an adiabatic temperature of about 900° K. Accordingly, the flow through the igniter combined with the flow through the bypass passage raises the average temperature of the combined exhaust gases to approximately 700° K., which is sufficient to ignite the catalytic converter at substantially the leading edge thereof. Accordingly, normal convective flow of the exhaust gases through the catalytic converter assists in propagating ignition of the converter. A temperature sensor in the catalytic converter causes a controller to operate a valve to divert substantially all of the exhaust gas flow through the bypass passage after the catalytic converter has ignited.

7 Claims, 2 Drawing Sheets

METHOD AND APPARATUS FOR TREATING EXHAUST GASES

Figure 1:
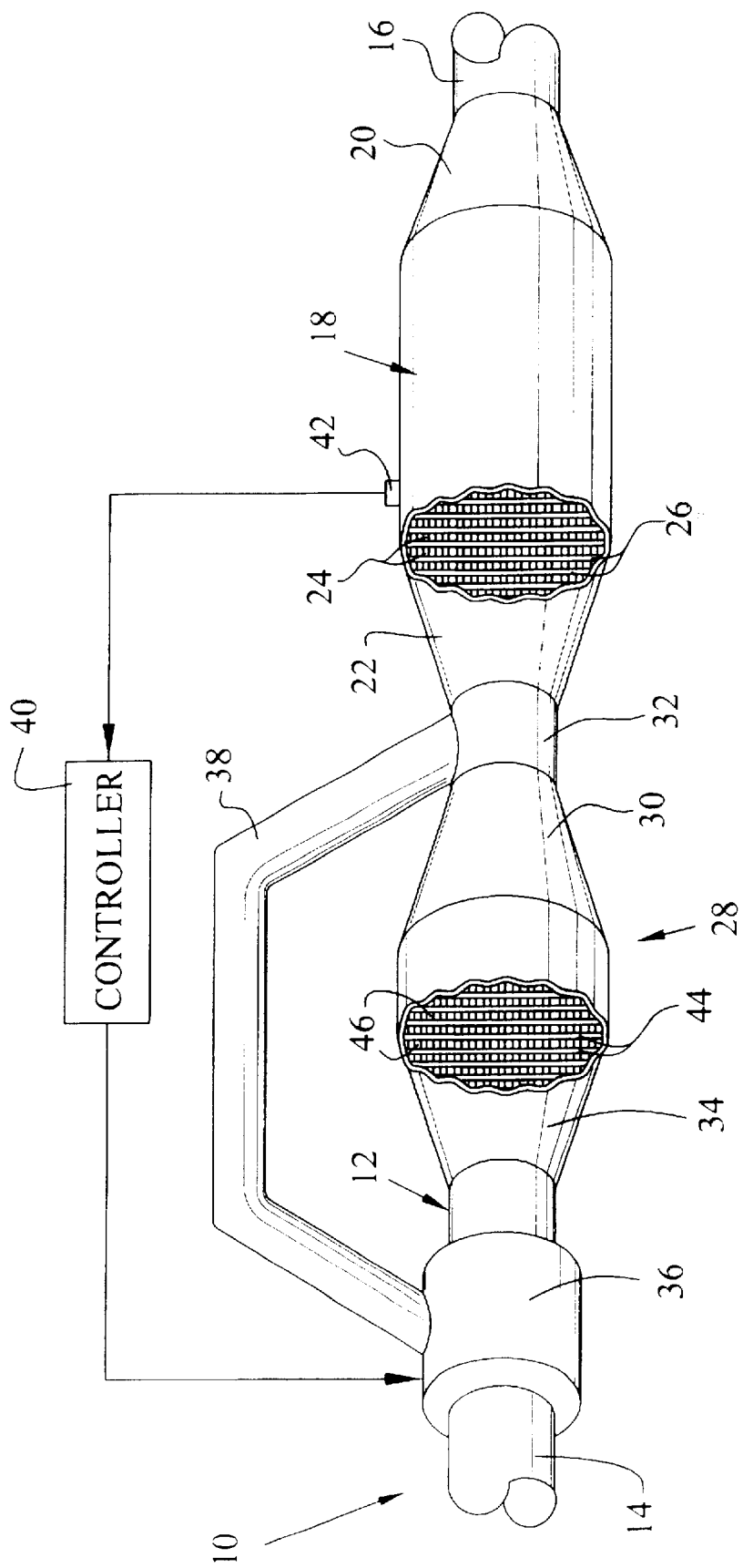

This invention relates to a method and apparatus for treating exhaust gases of an internal combustion engine to reduce the quantity of pollutants expelled into the atmosphere, particularly during engine warm-up.

Automotive vehicles have been equipped with catalytic converters for many years. The catalytic converter performs well to remove pollutants from the vehicle engine exhaust gases during most operating conditions. However, catalytic converters require a significant amount of heat energy to ignite and begin catalytic action. Accordingly, large quantities of pollutants are released into the atmosphere in the first few minutes after engine start-up due to the delay in heating the catalytic converter to the ignition or reaction temperature. It has been proposed that gases be preheated by dissipation heaters to shorten this delay, however, the drain on the battery caused by this heater is so great that a separate battery may be required. The purpose of the invention is to reduce, as much as possible, the time necessary for a cold catalytic converter to light off (ignite) to reduce the quantity of pollutants expelled into the atmosphere during the warm-up period. This is accomplished through the action of a catalytic preheater and bypass, with or without an electrical preheater. The catalytic preheater is designed and utilized in such a manner that it extracts the maximum amount of energy from catalytic oxidation of the exhaust stream, warming the gasses which feed into the converter so that the light off behavior is improved.

A conventional catalytic converter will not rapidly ignite unless inlet gases from the exhaust manifold of the automobile engine are at 700° K. or above. Unfortunately, the gases from an initially cold manifold begin at approximately 300° K., and ramp up to a steady temperature of 600° K. As a consequence, the light off behavior of the standard catalytic converter is poor. One technique which has been proposed to improve this performance is to preheat the gases entering the converter by using an electrical dissipation heater. However, the amount of electrical energy required to heat the cold exhaust gases to the desired temperature of 700° K. is so large that a separate battery may be required, particularly in cold climates. The proposed invention addresses this problem by using the heat content of the exhaust gases themselves to aid in the preheating process. The catalytic preheater can be used with or without an electrical preheater, although the light off performance will be better with some electrical preheating.

According to the present invention, a catalytic heater or igniter is placed in the engine exhaust pipe upstream of the catalytic converter. The igniter contains a catalyst that heats a portion of the exhaust gases, while the remainder of the exhaust gases are bypassed around the igniter. The igniter raises the temperature of gases 300° K. through oxidation of residual CO and $H_2$ pollutant in exhaust, so that, when combined with the gases bypassed around the igniter, the average temperature of the exhaust gas stream is raised from about 600° K. to 700° K., which is sufficient to ignite the catalytic converter at the leading edge thereof. Calculations show that the total ignition time is reduced from several minutes to approximately thirteen seconds for warm manifold exhaust gases, thereby reducing the release into the environment of carbon monoxide by a factor of four and nitrous oxides and hydrocarbons by a factor of ten during the cold converter start up period.

According to the present invention, a catalytic preheater or igniter is placed in the engine exhaust system upstream of the catalytic converter. The igniter is capable of raising the temperature of the exhaust gases from the initial temperature of 600° K., which is the temperature of the exhaust gases at the engine manifold, to an adiabatic temperature of about 900° K. Since an ordinary catalytic converter will rapidly ignite at its leading edge if the temperature of the exhaust gas is raised to 700° K., only about one third of the exhaust gases need to pass through the catalytic preheater or igniter. This reduced flow allows the preheater to be much shorter than the catalytic converter. The rest of the exhaust gas is bypassed around the catalytic preheater, and the gases are recombined at the inlet of the catalytic converter. Accordingly, the temperature of the combined gases is raised from 600° K. to 700° K.

If an electrical preheater is used, the amount of energy available to the electrical preheater depends on the battery type and operating conditions such as temperature. There will exist some maximum allowable draw on the battery, which will likely be a function of time after engine ignition. It is proposed to draw close to this maximum amount to warm the gases as much as possible. In order to promote rapid ignition in the catalytic preheater, however, sufficient gases are bypassed so that the electrical heater (with the allowable draw on the battery) can warm the gases to approximately 700° K. At this temperature the catalytic preheater rapidly ignites in a few seconds. The fraction of the gases passing through the electrical heater and catalytic preheater is then increased as much as possible without 1) the ignition in the preheater being extinguished or 2) the pressure drop becoming too large. The gases passing through the electrical heater and catalytic preheater are then mixed with the bypassed gases and enter the converter. The warmed gases then rapidly ignite the catalytic converter. When the converter reaches the desired operating temperature, the electrical preheater is shut off, and all gases are bypassed around the catalytic preheater and electrical preheater. This serves to preserve the life of the oxidation catalyst in the catalytic preheater. The optimum bypass and catalytic preheater of the embodiment are similar to those required without an electrical preheater, except that the controller adjusts the amount of gas flowing through the bypass and through the preheater. This can be accomplished by sensing the temperature of the gas stream leaving the electrical preheater: from a measured temperature rise and known energy input into the electrical preheater it is possible to determine the gas mass flow rate and adjust it accordingly.

Accordingly, the catalytic preheater may use a much smaller pore size, thereby improving the coupling between the gas temperature and the solid temperature, that is, the temperature of the catalyst is raised quite quickly to the temperature of the incoming gas without significantly increasing the pressure drop through the igniter and without requiring use of a high catalyst loading, which would substantially increase the cost. The normal catalytic converter may be made to ignite more quickly by increasing catalyst loading, but if all of the gas must pass through the catalytic converter, increasing the catalyst loading substantially increases the size and cost of the catalytic converter. Furthermore, since only one third of the exhaust gas passes through the catalytic preheater, the length of the preheater may be substantially reduced. The combination of all these effects results in a catalytic preheater which ignites after about 7 seconds for exhaust gases at 600° K., such that the catalytic preheater raises the temperature of the combined exhaust gases at the inlet of the catalytic converter to the required 700° K. The temperature of the combined exhaust gases at the inlet of the catalytic converter reaches this temperature about 6 seconds after the catalytic preheater ignites. Convection of the hot exhaust gases through the catalytic converter brings the temperature of the catalyst within the converter to a uniform reaction temperature in about 15 additional seconds. Accordingly, the catalytic converter is ignited in about 28 seconds. Accordingly, the requirements of the catalytic preheater are (1) a pore size as small as possible (down to about 300 $\mu$m radius, half of a conventional monolith radius) without significantly increasing the solid support heat capacity, (2) a catalyst loading sufficient for an ignition time of about 2.4 to 6 seconds at 600° K. inlet gas temperature (which is achievable with commercially available loadings), and (3) a length greater than the dispersion free ignition length (about 1.5 cm for typical loading and gas flow rate conditions). Such a design uses about half of the catalyst in an ordinary catalytic converter, and has an additional pressure drop less than half of a typical converter. If the bypass were not used, the catalyst required in the catalytic preheater increase by a factor of three and the pressure drop across the preheater would increase by a factor of nine.

Accordingly, by bypassing most of the exhaust gases around the preheater, an economical preheater may be provided which does not detrimentally affect the overall system. Because the catalytic preheater only warms the exhaust gases, it is not necessary to employ the complex three way catalyst used in the regular catalytic converter. Such oxidation catalysts are readily available. Accordingly, the present invention dramatically decreases ignition time of a catalytic converter, thereby substantially reducing the quantity of pollution expelled by motor vehicles during the converter warm up and ignition. This is accomplished with minimal additional cost, and substantially no detrimental affect on overall exhaust gas system performance.

Figure 2:
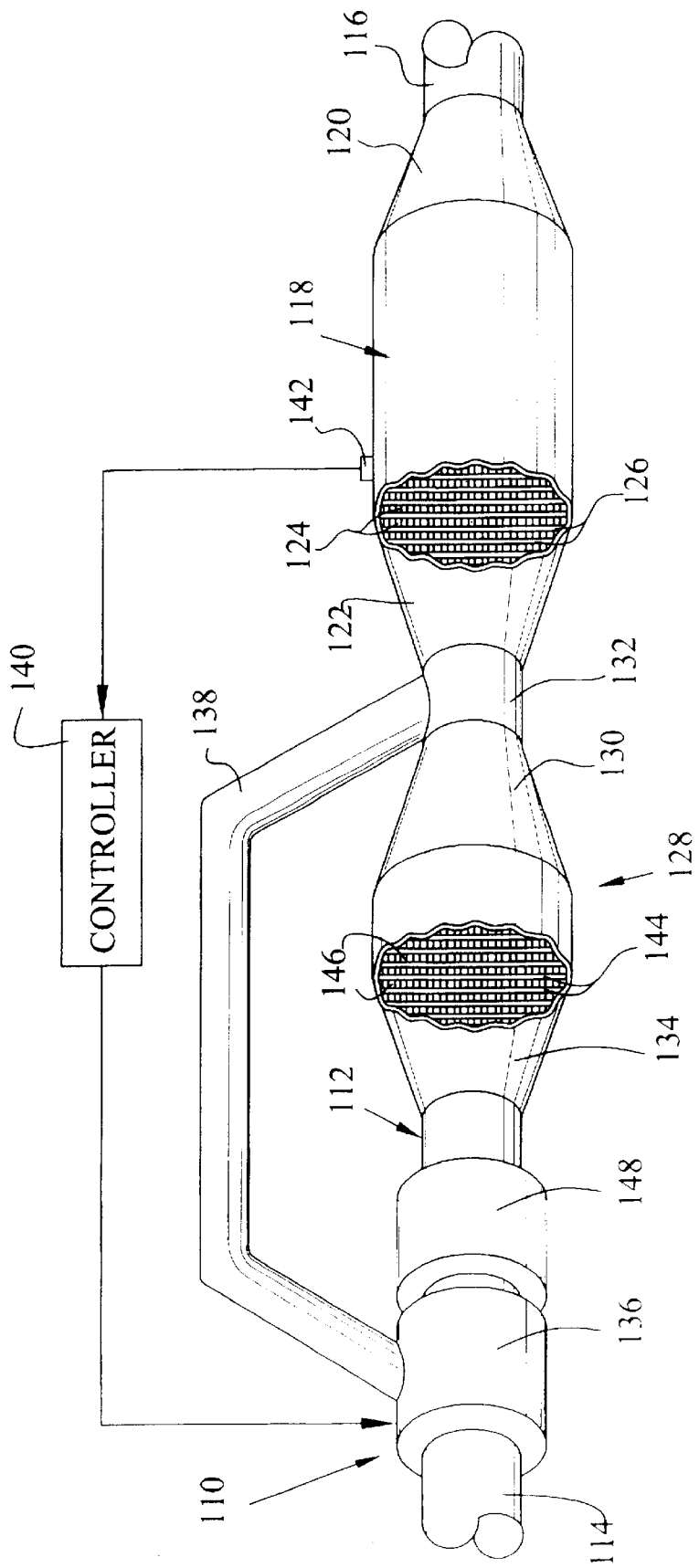

These and other advantages will become apparent from the following specification with reference to the accompany drawing, in which:

FIG. 1 is a diagrammatic illustration, partly in section, of an exhaust gas treatment system made to one embodiment of the present invention; and FIG. 2 is a diagrammatic illustration similar to FIG. 1, but illustrating another embodiment of the invention.

Referring now to the drawing, an exhaust gas treatment system generally indicated by the numeral 10 includes an exhaust pipe 12 having an inlet 14 which is connected to the exhaust manifold of the internal combustion engine upon which the system 10 is used and an outlet 16, which communicates exhaust gases to atmosphere. A conventional three way catalytic converter generally indicated by the numeral 18 includes as outlet section 20 connected to outlet 16 and an inlet section 22. Catalytic converter 18 is a monolithic catalytic converter having catalyst beads 24 carried on monolith supports 26. Accordingly, the beads 24 are spaced far enough from one another to permit exhaust flow through the converter 18 at a pressure drop that does not create unacceptable levels of back pressure on the system.

System 10 further includes a catalytic preheater or igniter generally indicated by the numeral 28. Igniter 28 includes an outlet section 30, which is connected to inlet section 22 of catalytic converter 18 through transition section 32 of exhaust pipe 12. Catalytic preheater or igniter 28 further includes an inlet section 34 which is connected through a diverter valve assembly generally indicated by the numeral 36 to inlet section 14 of exhaust pipe 12. A bypass duct 38 extends from the diverter valve 36 to the transition section 32, thereby bypassing the catalytic preheater igniter 28. A conventional electronic controller 40 responds to the temperature within the catalytic converter 18 as sensed by temperature sensor 42 to generate signals controlling the valve 36. Valve 36 is shiftable from a first position in which approximately two thirds of the exhaust gas flow is diverted through the bypass passage 38 and approximately one third of the exhaust gas flow is communicated through the catalytic preheater 28, to a second position in which substantially all of the exhaust gas flow through exhaust pipe 12 is diverted through the bypass passage 38. The catalytic preheater 28 includes a monolithic structure 44 which supports catalyst beads 46 to form a catalytic bed.

As discussed above, the catalytic preheater igniter 28 is designed to ignite quickly and to bring about one third of the total exhaust gas flow which is diverted through the preheater at an adiabatic temperature of approximately 900° K. as quickly as possible. Accordingly, the catalytic preheater or igniter 28 must have a pore size as small as possible (low as 300 micron radius, about one half of the monolith radius of the catalytic converter 18), and a catalyst loadings of about twice that of the catalytic converter 18, which is sufficient to reduce the dispersion of the heat of the exhaust gas within the preheater igniter 28 and thus reduce the ignition time of the catalytic preheater to about 2.4 to 6 seconds. The ignition time of a catalytic converter may be reduced by increasing the catalyst loading, but if the loading of the catalytic converter 18 were increased, the increased cost of the catalyst would be prohibitive. Furthermore, the preheater or igniter 28 must be sufficiently long so that the ignition length is within the catalytic converter. Because only one third of the exhaust flow is diverted through the preheater 28, a length of about 1.5 centimeters is all that is required for typical loading and typical gas flow rate conditions. It should be noted that without the bypass 38, the catalyst required by the preheater to attain the required loading would increase by a factor of three, and the pressure drop through the catalytic converter would increase by a factor of nine. Accordingly, the bypass 38 permits a preheater with a significantly less catalyst and with a significantly lower pressure drop than otherwise would be the case, while still heating the exhaust gas sufficiently that the temperature of the combined exhaust gases at the transition 32 is increased to a temperature of approximately 700° K., which is sufficient to ignite the catalytic converter 18 at the leading edge thereof.

In operation, approximately two-thirds of the exhaust gases flowing through exhaust pipe 12 before ignition of the catalytic converter 18 are diverted by valve 36 the catalytic preheater 28 through the bypass passage 38 and approximately one-third of the exhaust gases travel through the catalytic preheater 28. The catalytic preheater 28 ignites after about 2.4 to 6 seconds, and quickly raises the temperature of the exhaust gases traveling through the preheater 28 to the adiabatic temperature of approximately 900° K. The exhaust gases traveling through the preheater 28 are recombined with the exhaust gases which travel through the bypass passage 38 at the transition section 32. Since two-thirds of the exhaust gases have not been heated and approximately one-third of the exhaust gases have been heated by 300° K. (from 600° K. to 900° K.), the temperature of the combined gases at transition section 32 will be approximately 700° K. This temperature is sufficient to ignite the catalytic converter 18 at the leading edge of the catalyst bed. Since gases travel through the catalytic converter 18 from the inlet 22 to the outlet 20 thereof, convection of the exhaust gases causes heat to travel through the catalytic converter from the leading edge of the catalyst bed to the trailing edge thereof Since convection of the exhaust gases propagates ignition of the converter, the converter reaches operating temperatures much more quickly than prior art converters, in which ignition begins at the trailing edge thereof and must spread backward through the converter to a leading edge thereof, and is opposed by the convective flow of the exhaust gases.

After the catalytic converter 18 is ignited, the increase in temperature is sensed by temperature sensor 42, which transmits a signal to controller 40. Controller 40 then actuates the valve 36 to close off the catalytic preheater 28 and to divert all of the exhaust gas flow through the bypass passage 38. Accordingly, the catalytic preheater 28 is used only during the warm-up period, so that the durability required of conventional catalytic converters is not required. Furthermore, since the only function of the catalytic igniter 28 is to increase the temperature of the exhaust gases, simple catalysts may be used instead of the much more expensive three way catalysts used in conventional catalytic converter 18.

Referring to the embodiment or FIG. 2, elements the same or substantially the same as those in the embodiment of FIG. 1 retain the same reference character, but increased by 100. In FIG. 2, a constant-power dissipation heater 148 is placed ahead of the catalytic preheater 28. The power required by the heater 128 is supplied by the car battery. The bypass 138 and the preheater 128 minimize this power requirement compared to the conventional converter ignited by a dissipative heater because only a portion of the exhaust gas is heated. With the dissipation heater 148, the bypass can be controlled by controller 40 in a manner that allows the dissipation heater 128 to ignite the preheater 128 in a minimal time. This control strategy will further minimize the ignition time of the catalytic converter 18.

What is claimed is:

1. Exhaust gas treatment system for treating the exhaust gases of an internal combustion engine comprising:

an exhaust pipe;

a catalytic converter having an inlet and an outlet connected in said exhaust pipe for treating exhaust gases passing through said exhaust pipe;

an igniter in said exhaust pipe having an inlet and an outlet, the inlet of said catalytic converter being connected to the outlet of said igniter, said igniter including catalyst material for raising the temperature of the exhaust gases passing through said igniter to a temperature sufficient to ignite said catalytic converter;

a bypass passage extending around said igniter to communicate exhaust gases directly to said catalytic converter bypassing said igniter;

a control valve in said exhaust pipe shiftable from a first position in which a first portion of said exhaust gases are directed through said bypass passage and a second portion of the exhaust gases are directed through said igniter, said first portion being greater than said second portion, to a second position in which substantially all of the exhaust gases are directed through said bypass passage; and a controller responsive to the temperature within said catalytic converter for shifting said control valve between said first and second positions, said controller switching said valve to said first position after engine start but before ignition of said catalytic converter and to said second position after ignition of said catalytic converter.

2. Exhaust gas treatment system as claimed in claim 1, wherein said first portion constitutes about two-thirds of said exhaust gases.

3. Exhaust gas treatment system as claimed in claim 1, wherein said catalytic converter contains a bed of catalyst material, said bed having a leading edge adjacent said inlet, said igniter heating the exhaust gases passed therethrough to a temperature sufficient to ignite said catalyst at substantially the leading edge thereof.

4. Exhaust gas treatment system as claimed in claim 3, wherein said igniter heats the exhaust gases passed therethrough to an adiabatic temperature, said second portion of the exhaust gases passed through the igniter being mixed with said first portion of the exhaust gases passed through the bypass passage upstream of the leading edge of the catalyst whereby the temperature of the combined gases is less than the adiabatic temperature but greater than the temperature of the gases required to ignite the catalyst in the catalytic converter.

5. Exhaust gas treatment system as claimed in claim 1, wherein an electrically actuated heater is installed in said exhaust pipe upstream of said igniter.

6. Exhaust gas treatment system as claimed in claim 5, wherein a bypass passage extends around said heater and said igniter to communicate exhaust gases directly to said catalytic converter bypassing said heater and said igniter.

7. Exhaust gas treatment system as claimed in claim 6, wherein a diverter mechanism in said exhaust pipe directs a portion of said exhaust gases through the bypass passage and the remainder of the exhaust gases through said heater and said igniter prior to ignition of said catalytic converter.

\* \* \* \* \*

UNITED STATES PATENT AND TRADEMARK OFFICE
CERTIFICATE OF CORRECTION

PATENT NO. : 6,428,754 B1  Page 1 of 1
DATED : August 6, 2002
INVENTOR(S) : Hsueh-Chia Chang and David T. Leighton It is certified that error appears in the above-identified patent and that said Letters Patent is hereby corrected as shown below:

<u>Title page,</u>
Item [73], insert -- Assignee: University of Notre Dame, Notre Dame, Indiana (US) --;

<u>Column 1,</u>
Line 3, insert -- The U.S. Government has a paid-up license in this invention and the right in limited circumstances to require the patent owner to license others on reasonable terms as provided for by the terms of Grant Nos. CTS-9112977 and CTS-9200210 awarded by the National Science Foundation. --

Signed and Sealed this

Twenty-seventh Day of May, 2003

JAMES E. ROGAN
*Director of the United States Patent and Trademark Office*